United States Patent [19]

Son et al.

[11] 3,821,134

[45] June 28, 1974

[54] VULCANIZABLE POLYMER BLENDS OF DIENE RUBBERS AND GRAFTED EPDM POLYMERS

[75] Inventors: Pyong-Nae Son, Akron; Krishna C. Baranwal, Stow, both of Ohio

[73] Assignee: The B. F. Goodrich Company, New York, N.Y.

[22] Filed: Jan. 2, 1973

[21] Appl. No.: 320,543

[52] U.S. Cl............... 260/5, 260/79.5, 260/887, 260/888, 204/159.18
[51] Int. Cl. ...... C08c 9/08, C08d 9/04, C08f 29/12
[58] Field of Search... 260/5, 889, 79.5 NV, 79.5 P, 260/79.5 B, 79.5 A, 79.5 O

[56] References Cited
UNITED STATES PATENTS

| | | | |
|---|---|---|---|
| 3,271,477 | 9/1966 | Kresge | 260/877 |
| 3,343,582 | 9/1967 | Himes et al. | 260/889 |
| 3,451,962 | 6/1969 | Auler et al. | 260/889 |
| 3,706,819 | 12/1972 | Usamoto et al. | 260/889 |

*Primary Examiner*—Murray Tillman
*Assistant Examiner*—Thurman K. Page
*Attorney, Agent, or Firm*—J. Hughes Powell, Jr.

[57] ABSTRACT

Preparation of ethylene-higher α-olefin-polyene (EPDM) polymers having grafted thereon vulcanization accelerators and polymer blends with highly unsaturated diene rubbers that are cured using sulfur are disclosed. The vulcanizates exhibit improved properties compared to polymer blends of EPDM and diene rubbers.

8 Claims, No Drawings

VULCANIZABLE POLYMER BLENDS OF DIENE RUBBERS AND GRAFTED EPDM POLYMERS

BACKGROUND OF THE INVENTION

Ethylene-higher α-olefin-polyene (EPDM) polymers are known for their excellent vulcanizate properties of oxygen and ozone resistance, weatherability, and heat and chemical resistance. Unfortunately, the polymers lack building tack, oil resistance, hot tear resistance, and high internal strength. These disadvantages prohibit the use of EPDM polymers in applications such as tires and automotive and industrial hosing which have been dominated by high unsaturation diene rubbers such as natural rubber, styrene-butadiene rubbers, and polychloroprene. The diene rubbers have disadvantages in their lack of oxygen and ozone resistance, heat resistance, and weatherability. A practical solution to both problems would be to physically blend the two types of polymers and cure the blend to obtain a vulcanizate having the desirable properties of each type of polymer. One serious problem inhibiting success is cure incompatibility, the inability of a cure system to sufficiently cure each type of polymer in the polymer blend and to sufficiently co-vulcanize the types of polymers in the blend. Cure incompatibility is demonstrated by the inability of the vulcanizate to perform at a level predicted from a consideration of the ratios of the polymers in the blend. Often the performance will be much less than predicted, and even worse than the performance of either polymer alone when cured similarly. Such behavior is readily apparent in the stress-strain (tensile, elongation) properties, flex-heat build up, and oil swell properties. A major cause of cure incompatibility is the perference known vulcanization accelerators show for one polymer over another leading to overcure of the one polymer, and undercure of the other polymer. It would be advantageous to minimize this preference.

SUMMARY OF THE INVENTION

Vulcanization accelerators containing $—S_x—$ linkages where $x$ is 1 to about 6,

linkages, or —SH groups are grafted onto ethylene-higher α-olefin-polyene (EPDM) polymers using (i) Ultra-violet light, (ii) a hydrocarbon hypohalite, or (iii) a N-haloimide. The grafted EPDM polymers are admixed with highly unsaturated diene polymers and the blend cured using sulfur. The vulcanizates have excellent tensile, elongation, flex-heat build up, and oil-swell properties (if an oil resistant diene rubber is employed).

DETAILED DESCRIPTION

The ethylene-higher α-olefin-polyene (EPDM) polymers employed have an ethylene content of from about 15 percent to about 90 percent by weight, a higher α-olefin content of about 10 percent to about 80 percent by weight, and a polyene content of about 0.5 percent to about 20 percent by weight, all weights based on the total weight of the polymer. The higher α-olefin contains 3 to about 14 carbon atoms. Examples of these are propylene, isobutylene, 1-butene, 1-pentene, 1-octene, 2-ethyl-1-hexene, 1-dodecene, and the like. The polyene can be a conjugated diene such as isoprene, butadiene, chloroprene, and the like; a nonconjugated diene; a triene, or a higher enumerated polyene. Examples of trienes are 1,4,9-decatriene, 5,8-dimethyl-1,4,9-decatriene, 4,9-dimethyl-1,4,9-decatriene, and the like. The nonconjugated dienes are more preferred. The nonconjugated dienes contain from 5 to about 25 carbon atoms. Examples are nonconjugated diolefins such as 1,4-pentadiene, 1,4-hexadiene, 1,5-hexadiene, 2,5-dimethyl-1,5-hexadiene, 1,4-octadiene, and the like; cyclic dienes such as cyclopentadiene, cyclohexadiene, cyclooctadiene, dicyclopentadiene, and the like; vinyl cyclic enes such as 1-vinyl-1-cyclopentene, 1-vinyl-1-cyclohexene, and the like; alkylbicyclonondienes such as 3-methylbicyclo(4,2,1)nona-3,7-diene, 3-ethyl-bicyclonondiene, and the like; indenes such as methyl tetrahydroindene and the like; alkenyl norbornenes such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, and the like; and tricyclo dienes such as 3-methyl-tricyclo-$(5,2,1,0^{2,6})$-3,8-decadiene and the like.

Preferredly, the EPDM polymers contain from about 20 percent to about 80 percent by weight of ethylene, about 19 percent to about 70 percent by weight of a higher α-olefin, and about 1 percent to about 10 percent by weight of a nonconjugated diene. The more preferred higher α-olefins are propylene and 1-butene.

More preferredly, the EPDM polymers have an ethylene content of from about 50 percent to about 70 percent by weight, a propylene content of from about 20 percent to about 49 percent by weight, and a nonconjugated diene content from about 1 percent to about 10 percent by weight, all weights based upon the total weight of the polymer.

The EPDM polymers have molecular weights from about 20,000 to about 2,000,000 or more. Their physical form varies from waxy materials to rubbers to hard plastic-like polymers. They have dilute solution viscosities (DSV) from about 0.5 to about 10, measured at 30° C. on a solution of 0.1 gram of polymer in 100 cc. of toluene.

The EPDM polymers are grafted with a vulcanization accelerator having (a) $—S_x—$ linkages where $x$ is 1 to about 6, or (b) having

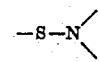

linkages, or (c) having a —SH group. Vulcanization accelerators having a $—S_x—$ and/or

linkage include thiuram sulfides of the formula

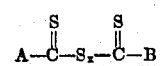

where $x$ is 1 to about 6, and A and B are selected from the group consisting of

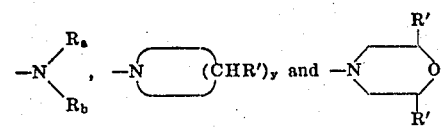

wherein $R_a$ and $R_b$ are hydrogen, alkyl radicals containing 1 to 24 carbon atoms, an aryl radical, alkaryl radical or aralkyl radical containing 6 to 18 carbon atoms, a cycloalkyl radical containing 3 to 8 carbon atoms in the ring, and R' is hydrogen or an alkyl radical containing 1 to 4 carbon atoms and $y$ is 2 to 7. The alkyl radicals can be linear or branched and can contain primary, secondary and/or tertiary carbon atom configurations. The aryl, alkaryl, aralkyl, cycloalkyl and heterocyclic radicals can further be substituted with alkyl radicals containing 1 to 8 carbon atoms. Examples of the thiuram sulfide compounds are: tetramethylthiuram monosulfide, tetraethylthiuram monosulfide, tetrabutylthiuram monosulfide, tetramethylthiuram disulfide, tetraethylthiuram disulfide, tetrabutylthiuram disulfide, tetraoctylthiuram disulfide, tetradodecylthiuram disulfide, tetraoctadecylthiuram disulfide, tetrabenzylthiuram disulfide, tetracyclohexylthiuram disulfide, N,N-dimethyl-N',N'-dibenzylthiuram disulfide, N,N-dimethyl-N',N'-diphenylthiuram disulfide, N,N-diethyl-N',N'-didecylthiuram disulfide, N-pentamethylene-N',N'-diemthylthiuram disulfide, N,N-diethyl-N'-hexamethylenethiuram disulfide, N,N'-dipentamethylenethiuram disulfide, N-oxydiethylene-N',N'-dimethylthiuram disulfide, tetramethylthiuram hexasulfide, dipentamethylenethiuram hexasulfide, and the like.

Other accelerators containing an —$S_x$— and/or

linkage are sulfenamides of the formula R"—$S_x$—A and thiocarbamylsulfenamides of the formula

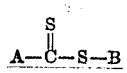

wherein A, B and $x$ are defined as above and R" is an alkyl radical containing 1 to 18 carbon atoms, an aryl radical, an alkaryl radical, an aralkyl radical containing 6 to 18 carbon atoms, a cycloalkyl radical containing 3 to 8 carbon atoms in the ring, a heterocyclic radical containing 3 to 8 atoms in the ring selected from carbon, oxygen, sulfur and nitrogen wherein at least two atoms are carbon, or a thiazole ring especially a benzothiazole ring. Examples of the sulfenamide compounds are methylsulfenamide, isopropylsulfenamide, octylsulfenamide, phenylsulfenamide, N,N-dimethyl cyclohexylsulfenamide, N,N-dioctyl octadecylsulfenamide, N,N-diisopropyl phenylsulfenamide, N,N-diphenyl benzylsulfenamide, N-methyl-N-octyl cyclobutylsulfenamide, N,N-diethyl cyclohexylsulfenamide, N,N-diphenyl cyclohexylsulfenamide, N,N-dimethyl cyclobutylsulfenamide, N,N-dicyclohexyl cyclopentylsulfenamide, N-pentamethylene cyclohexylsulfenamide, N-hexamethylene octylsulfenamide, N,N-dioctyl morpholinylsulfenamide, N,N-diphenyl morpholinylsulfenamide, N-(oxydiethylene) morpholinylsulfenamide, N,N-diemthyl-2-benzothiazylsulfenamide, N,N-diisopropyl-2-(4,5-dimethylthiazyl)sulfenamide, N-methyl-N-cyclohexyl-2-(4,5-dimethylthiazylsulfenamide, N,N-diisopropyl-2-benzothiazylsulfenamide, N,N-diethyl-2-benzothiazylsulfenamide, N-methyl-N-benzyl-2-benzothiazylsulfenamide, N,N-di(tert-butyl)-2-benzothiazylsulfenamide, N,N-dicyclohexyl-2-benzothiazylsulfenamide, N-oxythylene-2-benzothiazylsulfenamide, N-(2,6-dimethyl)oxydiethylene-2-benzothiazylsulfenamide, N-oxydiethylene-2-benzothiazylsulfenamide, N,N-dimethyl-2-(4,6-dimethylbenzothiazyl) sulfenamide, and the like.

Examples of the thiocarbamylsulfenamide compounds are thiocarbamylsulfenamide, N,N-dimethylthiocarbamylsulfenamide, N-methylthiocarbamyl-N'-ethylsulfenamide, N-octylthiocarbamyl-N'-phenylsulfenamide, N-phenylthiocarbamyl-N',N'-dibenzylsulfenamide, N,N-dimethylthiocarbamyl-N',N'-dimethylsulfenamide, N,N-diethylthiocarbamyl-N',N'-diethysulfenamide, N,N-dimethylthiocarbamyl-N',N'-diisopropylsulfenamide, N,N-dimethylthiocarbamyl-N',N'-dicyclohexylsulfenamide, N,N-dimethylthiocarbamyl-N'-oxydiethylenesulfenamide, N,N-didecylthiocarbamyl-N',N-didecylsulfenamide, N,N-didodecylthiocarbamyl-N',N'-diphenylsulfenamide, N,N-dibenzylthiocarbamyl-N',N'-dibenzylsulfenamide, N-tetramethylenethiocarbamyl-N'-oxydiethylenesulfenamide, N-pentamethylenethiocarbamyl-N'-oxydiethylenesulfenamide, N-hexamethylenethiocarbamyl-N'-oxdiethylenesulfenamide, N-hexamethylenethiocarbamyl-N',N'-dicyclohexylsulfenamide, N-oxydiethylenethiocarbamyl-N',N'-diisopropylsulfenamide, N-oxydiethylenethiocarbamyl-N',N'-di(secondarybutyl)sulfenamide, N-oxydiethylenethiocarbamyl-N',N'-di-(2,2-dimethylethyl)sulfenamide, N-oxydiethylenethiocarbamyl-N',N'-di-(2-ethylhexyl)sulfenamide, N-oxydiethylenethiocarbamyl-N',N'-dicyclohexylsulfenamide, N-(oxydiethylene)thiocarbamyl-N'-(2, 2,6,6-tetramethylpentamethylene)sulfenamide, N-(oxydiethylene) thiocarbamyl-N'-(oxydiethylene)sulfenamide, N-(3,5-dimethyloxydiethylene)thiocarbamyl-N'-(3,5-dimethyloxydiethylene)sulfenamide, N-(3,5-dimethyloxydiethylene)thiocarbamyl-N',N'-dicyclohexylsulfenamide, and the like.

Examples of other useful accelerators are the sulfide compounds containing a —$S_x$— linkage, such as 2,2'-benzothiazyl disulfide, 2-(2,4-dinitrophenylthio)benzothiazole, 2-benzothiazyl-N,N-diethylthiocarbamyl sulfide, 2-benzothiazyl-4-morpholinyl disulfide, 4,4'-dithiobismorpholine, and 4,4'-dithiobispiperidine; and dixanthogen disulfides of the formula

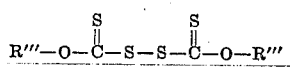

wherein R''' is an alkyl radical containing 3 to 6 carbon atoms. Examples of these compounds are diisopropyl dixanthogen disulfide, dibutyl dixanthogen disulfide, and the like.

Accelerators containing an -SH group include the azole compounds such as 2-mercaptobenzothiazole, N,N-diisopropyl-2-mercaptobenzothiazole sulfenamide, N,N-diethylthiocarbamyl-2-mercaptobenzothiazole, and the like; 2-mercaptobenzothiazoline, 2-mercaptobenzoimidazoline, 2-mercaptothiazoline and 2-mercaptoimidazoline.

The accelerators containing —$S_x$— and/or

linkages and —SH groups are grafted onto EPDM polymers using (i) Ultraviolet (UV) light, (ii) a hydrocarbon hypohalite of the formula

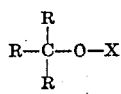

where X is chlorine or bromine and R is hydrogen, an aryl radical containing 6 to about 10 carbon atoms, or an alkyl radical containing 1 to about 8 carbon atoms, at least two R groups being an alkyl and/or aromatic radical, or (iii) a N-haloimide such as N-chlorosuccinimide, N-bromo-succinimide, 1,3-dichloro-5,5-dimethylhydantoin, and 1,3-dibromo-5,5-dimethylhydantoin.

Examples of hydrocarbon hypohalites are tert-butyl hypohalite, tert-butyl hypobromite, tert-amyl hypochlorite, pentyl-2-hypochlorite, octyl-3-hypobromite, and benzyl hypochlorite. Preferredly, R is an alkyl radical containing 1 to 8 carbon atoms, wherein each R can be the same or different than the other R radicals. Most preferredly, each R is a methyl or ethyl radical and the compound is a tertiary alkyl hypohalite such as tert-butyl hypochlorite. If a hypohalite or N-haloimide is employed, the compound is used in a range from about 0.1 percent to about 5 percent by weight based upon the weight of EPDM polymer used. Alkyl hypohalites are disclosed in U.S. Pat. No. 3,551,394.

If UV light is employed, the wavelength range used is from about 2,500A to about 4,000A, and more preferredly from about 3,000A to about 3,800A. Lamps that emit radiation within this range is sufficient to activate the vulcanization accelerators and effect grafting of the accelerators onto the unsaturated polymer. To accelerate the graft reaction, photosensitizers can be used. Examples of photosensitizers are benzophenone, triphenylphosphine, and anthracene. The photosensitizers are employed in low levels, ranging from about 0.01 percent to about 2 percent by weight based upon the weight of the EPDM polymer employed.

The grafting of the accelerators onto EPDM polymer can be done in bulk, or in emulsion, suspension, or solution. Because of costs, the need for extra emulsifying or suspending ingredients and extra procedural steps such as emulsification and coagulation, and the efficiency of grafting, a solution process is preferred. The EPDM polymer, the accelerator, and the photosensitizer (if used) or hypohalite or imide are dissolved in a solvent. Examples of solvents are benzene, toluene, hexane, and the like. The grafted EPDM polymers are isolated from solution by direct drying or by coagulation using water or a low alkyl alcohol such as methanol or ethanol.

The vulcanization accelerators are used in the graft process at a level ranging from about 0.1 percent to about 40 percent by weight based upon the weight of the EPDM polymer. More preferred, the accelerators are used in from about 0.5 percent to about 10 percent by weight. Of course, the determinative factor is the amount of accelerator required to effectively cure both the EPDM polymer and the diene rubber in the blend. If accelerators were added externally in a Banbury or on a two-roll mill, the standard amount of accelerator used would vary from about 0.1 part to about 5 parts by weight based upon 100 parts by weight of polymer. In the present invention, levels of accelerator grafted onto the EPDM polymer are from about 0.1 percent to about 10 percent by weight, and more preferredly from about 0.2 percent to about 5 percent by weight based upon the weight of the polymer.

If the amount of accelerator grafted onto the EPDM polymer is low, additional accelerator can be added while the grafted EPDM polymer and high unsaturation diene rubber are being mixed. The addition can be made following standard mixing techniques. In such a case, from about 0.1 to about 1.0 part of additional accelerator can be added per 100 parts by weight of the polymer blend. The additional accelerator can be one of the accelerators described herein, or any compound known as a vulcanization accelerator for unsaturated polymers. Examples of some other accelerators are thioureas such as ethylene thiourea, N,N-dibutylthiourea and the like; polyamines such as hexamethylene tetraamine, tricretonylidene tetraamine, and the like; and aldehyde and amine condensation products such as butyaldehyde-butyl amine, heptaldehyde-aniline, and the like.

Temperatures employed in the graft process range from about 0° to about 100° C., and more preferably from about 25° to about 70° C. Graft reaction times are from about 1 hour to about 24 hours.

The accelerators are presumably grafted onto the unsaturation site of the EPDM polymer. It is believed that the accelerators split at the —$S_x$—,

and —S—H positions to yield a graft wherein the accelerator is attached to the polymer through a —C—S— bond. A grafted EPDM structure can be shown as follows:

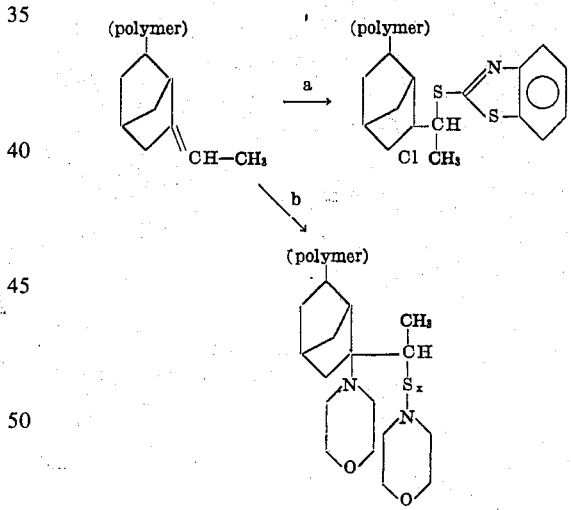

a: 2-mercaptobenzothiazole
b: 4,4'-dithiobismorpholine

The grafted EPDM polymers have molecular weights, physical form, and DSV viscosities similar to that of the EPDM polymer employed. The grafted EPDM can be purified by solvent washes and/or acetone extractions of soluble material. The presence of the accelerator graft may be determined by nitrogen and sulfur analysis.

The highly unsaturated diene rubbers employed have an olefinic

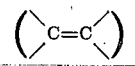

content from about 20 percent to about 45 percent by weight based upon the total weight of the polymer. The rubbers usually contain at least 50 percent and up to 100 percent by weight of a conjugated diene monomer containing 4 to about 8 carbon atoms, and up to about 50 percent by weight of copolymerizable vinylidene monomers having a terminal vinylidene

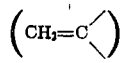

group. Examples of the conjugated diene monomers are butadiene, isoprene, chloroprene, 2-isopropyl-1,3-butadiene, 1,3-pentadiene, and the like. More preferred are the conjugated dienes containing 4 to about 6 carbon atoms such as butadiene, chloroprene, and isoprene.

Examples of copolymerizable vinylidene monomers containing a terminal vinylidene group are (a) monoolefins containing 2 to about 8 carbon atoms; (b) vinyl aromatics such as styrene, α-methyl styrene, vinyl toluene, chlorostyrene, and the like; (c) vinyl nitriles such as acrylonitrile, methacrylonitrile, and the like; (d) vinyl and allyl esters such as vinyl acetate, vinyl propionate, allyl acetate, and the like; (e) vinyl and allyl ethers such as vinyl methyl ether, allyl methyl ether, and the like; (f) divinyls and diacrylates such as divinyl benzene, divinyl ether, diethylene glycol diacrylate, and the like; and (g) acrylates of the formula

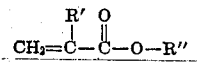

wherein R' is —H, —CH₃ or —C₂H₅, and R'' is an alkyl radical containing 1 to 18 carbon atoms or an alkoxyalkyl, an alkylthioalkyl, or cyanoalkyl radical containing 2 to about 12 carbon atoms. Examples of such acrylates are ethyl acrylate, butyl acrylate, octadecyl acrylate, methoxyethyl acrylate, butoxyethyl acrylate, hexylthioethyl acrylate, β-cyanoethyl acrylate, cyanooctyl acrylate, methyl methacrylate, octyl methacrylate, ethyl ethacrylate, and the like.

The diene rubbers include natural rubber, the general purpose synthetic rubbers, and specialty rubbers. Examples of the highly unsaturated diene rubbers are natural rubber, polyisoprenes, polybutadienes, poly(butadiene-styrene) rubbers, poly(isoprene-styrene) rubbers, polychloroprenes, poly(butadiene-acrylonitrile) rubbers, poly(isopren-acrylonitrile) rubbers, polypentenamer rubbers, and the like. The rubbers have molecular weights and DSV values similar to those of the EPDM polymers.

The grafted EPDM polymer and diene rubber can be blended together in any ratio of one to the other. The weight percent of grafted EPDM polymer in the blend can be from about 1 percent to about 99 percent. More often, the weight percent of grafted EPDM will be from about 10 percent to about 95 percent by weight of the blend. Excellent improvement in vulcanizate properties is demonstrated in blends containing from about 25 percent to about 90 percent by weight of grafted EPDM polymer based upon the weight of the blend.

More than one grafted EPDM polymer can be employed in the blend. Similarly, more than one diene rubber can be employed. Therefore, though many blends will contain only two polymers, over two and up to 4 or more polymers can be present in a blend. In such a case, the grafted EPDM polymers are treated as a group, and the diene rubbers treated as a group, for purposes of determining the weight percents of the polymers in the blend. For example, a blend containing 30 percent by weight of a polymer of ethylene-propylene-alkenyl norbornene grafted with mercaptobenzothiazole, 50 percent by weight of polyisoprene, and 20 percent by weight of poly(butadiene-styrene) would contain 30 percent by weight of grafted EPDM and 70 percent by weight of diene rubber for the purposes of this invention.

The polymer blend is cured using sulfur or a sulfurdonor as the vulcanization agent. The sulfur or sulfurdonor is used in a range from about 0.5 to about 10 parts by weight based upon 100 parts by weight of the polymer blend. More preferredly, the range is from about 1 part to about 5 parts by weight. Examples of sulfur-donors are tetramethylthiuram disulfide, tetraethylthiuram disulfide, dipentamethylenethiuram hexasulfide, and the like.

The grafted EPDM polymer, the diene rubber, and the sulfur are admixed using standard mixing techniques and procedures. The mixing equipment used can be Banburys, Henschel mixers, extruders, two-roll mills and like equipment. The ingredients are mixed at a temperature and for a time to obtain uniform mixing.

Many other compounding ingredients may be used along with the sulfur or sulfur-donor. Such ingredients include activators such as zinc, calcium, and magnesium oxide, lead monoxide and dioxide, fatty acids such as stearic and lauric acid, and salts thereof such as cadmium, zinc and copper stearate and lead oleate; fillers such as channel blacks, reinforcing blacks, and thermal blacks, calcium and magnesium carbonate, calcium and barium sulfates, aluminum silicates, phenolformaldehyde and polystyrene resins, asbestos, and the like; plasticizers and extenders such as dialkyl and diaryl organic acids like diisobutyl, diisooctyl, diisodecyl, and dibenzyl oleates, stearates, sebacates, azelates, phthalates, and the like, ASTM type 2 petroleum oils, ASTM D-2226 aromatic, naphthalenic and paraffinic oils, castor oil, tall oil, glycerin, and the like; antioxidants, antiozoants, and stabilizers such as di-β-naphthyl-p-phenylenediamine, phenyl-β-naphthylamine, dioctyl-p-phenylenediamine, N-1,3-dimethylbutyl-N-phenyl-p-phenylenediamine, 4-isopropylamino diphenylamine, 2,6-di-t-butyl paracresol, 2,2'-methylenebis-(4-ethyl-6-t-butyl phenol), 2,2'-thiobis-(4-methyl-6-t-butyl phenol), bisphenol-2,2'-methylenebis-6-t-butyl-4-ethyl phenol, 4,4'-butylidenebis-(6-t-butyl-m-cresol), 2-(4-hydroxy-3,5-t-butylaniline)-4,6-bis(octylthio)-1,3,5-triazine, hexahydro-1,3,5-tris-β-(3,5-di-t-butyl-4-hydroxyphenyl)propionyl-s-triazine, tris-(3,5-di-t-butyl-4-hydroxybenzyl)isocyanurate, tetrakismethylene-3(3',5'-di-t-butyl-4'-hydroxyphenyl)propionate methane, distearyl thiodipropionate, dilauryl thiodipropionate, tri(nonylatedphenyl) phosphite, and the like; and other ingredients such as pigments, tackifiers, flame retardants, fungicides, and the like.

Although the disclosure is directed to blends of grafted EPDM polymers with diene rubbers, the graft process can be effectively used to graft vulcanization accelerators on other low unsaturation polymers. Examples of such polymers are butyl rubbers prepared by the interpolymerization of isobutylene and isoprene; polymers of ethylene, higher α-olefins, and conjugated dienes such as butadiene, isoprene, and the like; polymers prepared by the interpolymerization of diene monomers with lower (1-8 carbon) alkyl acrylate monomers; and polymers prepared by the interpolymerization of diene monomers with vinyl ketones, vinyl esters, or vinyl ethers. The weight percent range of these grafted low unsaturation polymers employed with the diene rubbers is similar to that of the EPDM polymer. The level of sulfur employed in the polymer blend is also similar. The graft process can also be effectively used to graft accelerators onto high unsaturation rubbers such as those rubbers herein disclosed.

The composition of (1) a highly unsaturated diene rubber, (2) a grafted EPDM polymer, and (3) sulfur or a sulfurdonor cures readily to yield vulcanizates having improved tensile strength, elongation, flex-crack resistance, ozone and oxygen resistance, heat resistance, and oil resistance (if blended with an oil resistant diene) over that of blends containing nongrafted polymers cured using commonly known accelerators. Vulcanization temperatures and times employed are typical; temperatures ranging from about 250° to about 400° F., and times ranging from about 10 minutes to about 60 minutes.

The composition vulcanizates are useful in applications requiring resistance to heat, oxygen, ozone chemicals, oil, and flex-cracking. The vulcanizates are of particular use in automotive applications such as tires, hosing, belting, gaskets, seals, weatherstripping, and windshield wiper blades.

The vulcanizates were evaluated as to tensile and elongation following ASTM D-412, hardness following ASTM D2240 (durometer A), and flex heat build-up following the procedure ASTM D623 (B.F.G. Flexometer at 143 psig at 50° C. and 17.5 percent). The flexometer test employs a 0.5 inch diameter, 1.0 inch height cylinder of the vulcanized polymer blend. The cylinder is subjected to cyclic compressions of a given percent, at a given load and a given temperature. After time has elapsed, the temperature of the cylinder is recorded. The results are given as temperature rise, or ΔT.

The following Examples serve to more fully illustrate the invention. Ingredients are given in parts by weight unless otherwise specified.

EXAMPLE I

The vulcanization accelerator, 4,4'-dithiobismorpholine, was grafted onto an EPDM polymer comprising 55 percent by weight of ethylene, 36 percent by weight of propylene, and 9 percent by weight of ethylidene norbornene, and having a Mooney viscosity of 50 (ML-10 at 212° F.). 100 grams of the EPDM polymer was dissolved in 900 milliliters of benzene, 33.1 grams (0.14 mole) of 4,4'-dithiobismorpholine was added, followed by 0.2 grams of benzophenone as a UV sensitizer. The solution was put into a pyrex glass vessel and stirred for 21 hours while being irradiated using a General Electric FC12T10-BL Black Light fluorescent lamp placed at a distance of 2 inches from the vessel. Temperature of the reaction was about 35° ± 5° C.

The grafted EPDM polymer was isolated by coagulation in methanol. The methanol was dried down and 23.0 grams of unreacted 4,4'-dithiobismorpholine was recovered (identified by its Infra-red spectrum). The wet polymer was then dried to constant weight in a vacuum oven. A portion of the polymer was extracted with acetone for 16 hours to purify it. This portion was then analyzed as to its sulfur content, which was 0.23 percent by weight. The sulfur content reflects a grafted accelerator content of about 0.85 percent by weight.

The procedure was repeated using 23.6 grams (0.10 mole) of 4,4'-dithiobismorpholine in the graft reaction. The reaction time was 21 hours.

EXAMPLE II

Following the procedure and recipe given in Example I, 4,4'-dithiobispiperidine was grafted onto EPDM polymer. The EPDM used was the same as in Example I. 15 grams of 4,4'-dithiobispiperidine was used in place of the dimorpholine compound. The reaction solution was irradiated for 19 hours, and the grafted EPDM was isolated by coagulation with methanol. An acetone extracted portion of the grafted EPDM was analyzed for its sulfur content. The sulfur content was 0.28 percent by weight, reflecting a graft content of about 1.0 percent by weight of the polymer. The original EPDM had a DSV value of 1.20. The grafted EPDM had a DSV value of 1.23.

EXAMPLE III

The EPDM polymers grafted with 4,4'-dithiobismorpholine (in Example I) and with 4,4'-dithiobispiperidine (in Example II) were mixed with Natural Rubber and cured. As a control, a mix of the original EPDM and Natural Rubber was cured using a commonly known cure system. The polymers and compounding ingredients were mixed in a Banbury mixer, and the sulfur and accelerator were added on a two-roll mill. The recipes used and the cure data obtained are as follows:

| | 1 | 2 | 3 | 4 | 5 |
|---|---|---|---|---|---|
| Grafted EPDM | 70[a] | 70[b] | 70[b] | 70[c] | — |
| EPDM | — | — | — | — | 70 |
| Natural rubber | 30 | 30 | 30 | 30 | 30 |
| N660 black | 55 | 55 | 55 | 55 | 55 |
| Naphthenic oil | 25 | 25 | 25 | 25 | 25 |
| Zinc oxide | 10 | 5 | 5 | 5 | 10 |
| Stearic acid | 1 | 1 | 1 | 1 | 1 |
| 2-morpholinothiobenzothiazole | — | — | 0.5 | 0.5 | 0.8 |
| Tetramethylthiuram disulfide | — | — | — | — | 0.8 |
| Sulfur | — | — | 0.5 | 0.5 | 1.5 |
| Viscurometer at 302°F. | | | | | |
| $t_3$, scorch, minutes | 18 | 15 | 12 | 8 | 3 |
| $t_{90}$, cure, minutes | 41 | 42 | 28 | — | 6 |
| Cured at 302°F., minutes | 41 | 45 | 30 | 25 | 6 |
| Tensile, psig | 1810 | 2040 | 2240 | 2170 | 980 |
| 300% modulus, psig | 1300 | 900 | 1320 | 1110 | 750 |
| Elongation, percent | 410 | 600 | 490 | 500 | 460 |
| Durometer A hardness | 54 | 55 | 57 | — | 64 |
| B.F.G. Flexometer 143 psig, 0.175" stroke, 50°C. ΔT | 62 | 80 | 51 | 57 | blow-out | a = EPDM graft polymer of Example I
b = Repeat EPDM polymer of Example I
c = EPDM graft polymer of Example II Samples 1 and 2 used no extra sulfur over that supplied by the unreacted, unextracted 4,4'-dithiobismorpholine in the EPDM polymers. Small amounts of accelerator and sulfur were added to samples 3 and 4. Samples 1, 2, 3 and 4 show much improved tensile strength and lower flex heat build-up compared to the control, sample 5.

EXAMPLE IV

Mercaptobenzothiazole was grafted onto an EPDM polymer having a composition of 60 percent by weight ethylene, 36 percent by weight of propylene, and 4 percent by weight of ethylidene norbornene, and having a Mooney viscosity of 50 (ML-10 at 212° F.). 100 grams of the EPDM polymer, 8.25 grams (0.049 mole) of 2-mercaptobenzothiazole and 6.8 grams (0.0625 mole) of t-butyl hypochlorite (added as a solution in 100 milliliters of benzene) were dissolved in 1,400 milliliters of benzene. The solution was placed in a vessel and agitated for 3 hours at a temperature of about 40° ± 5° C.

The grafted polymer was isolated by coagulation in methanol. 5.5 grams of 2,2'-dibenzothiazyl disulfide (identified through its Infra red spectra) was washed out with the methanol. A sample of the polymer was extracted with acetone for 16 hours and an analysis was then made for sulfur content. The polymer had a weight percent sulfur content of 0.39 percent, reflecting a grafted accelerator content of about 0.98 percent by weight of the polymer.

The procedure was repeated using 150 grams of EPDM, 12.4 grams of 2-mercaptobenzothiazole, 10.2 grams of t-butyl hypochlorite, and 2,300 milliliters of benzene. 8.0 grams of 2,2'-dibenzothiazyl disulfide was recovered from the methanol. The polymer has a grafted accelerator content of about 1.0 percent by weight of the polymer.

EXAMPLE V

Example IV was repeated using an EPDM containing ethylene-propylene-7.0 percent by weight dicyclopentadiene terpolymer, and an EPDM containing ethylene-propylene-3.5 percent by weight 1,4-hexadiene terpolymer. The grafted EPDM polymers were isolated, and a portion of each extracted with acetone and analyzed for its sulfur content. The polymers had mercaptobenzothiazole graft contents of about 1.0 percent by weight and about 3.2 percent by weight respectively. The original polymers had DSV values of 1.30 and 1.72 respectively. The grafted polymers had DSV values of 1.36 and 1.53 respectively.

EXAMPLE VI

The accelerator, 2-mercaptobenzothiazole was grafted onto EPDM polymer using 1,3-dibromo-5,5-dimethylhydantoin. The EPDM polymer used is a terpolymer of ethylene-propylene-4 percent by weight of 5-ethylidene-2-norbornene. 100 grams of EPDM and 8.2 grams of MBT (0.049 mole) were dissolved in 1,000 milliliters of benzene. The solution was cooled to 5° C. and 8.6 grams (0.03 mole) of 1,3-dibromo-5,5-dimethylhydantoin was added. The solution was then heated to 60° ± 2° C. for 4.5 hours. The grafted EPDM was isolated and a portion extracted with acetone for sulfur analysis. The sulfur content indicated about a 0.21 percent by weight graft content. The EPDM polymer had a DSV value of 1.61, and the grafted polymer had a DSV value of 1.46.

EXAMPLE VII

The EPDM polymers grafted with 2-mercaptobenzothiazole were mixed with Natural Rubber and cured. Control mixes were prepared containing the original EPDM polymers and Natural Rubber. The recipes used and the data obtained are as follows:

|  | 1 | 2 | 3 | 4 | 5 | 6 | 7 | 8 |
|---|---|---|---|---|---|---|---|---|
| Grafted EPDM | 70[a] | 70[b] | 70[b] | 70[c] | 70[d] | 70[e] | — | — |
| EPDM[1] | — | — | — | — | — | — | 70 | — |
| EPDM[2] | — | — | — | — | — | — | — | 70 |
| Natural rubber | 30 | 30 | 30 | 30 | 30 | 30 | 30 | 30 |
| N660 black | 55 | 55 | 55 | 55 | 55 | 55 | 55 | 55 |
| Naphthenic oil | 25 | 25 | 25 | 25 | 25 | 25 | 25 | 25 |
| Zinc oxide | 10 | 3 | 3 | 3 | 3 | 3 | 10 | 10 |
| Stearic acid | 1 | 1 | 1 | 1 | 1 | 1 | 1 | 1 |
| 2-morpholinothiobenzothiazole | — | — | — | — | — | — | 0.8 | 0.8 |
| Tetramethylthiuram disulfide | — | — | — | — | — | — | 0.8 | 0.8 |
| 2-mercaptobenzothiazole | — | — | 0.5 | 0.5 | 0.5 | 0.5 | — | — |
| Sulfur | 1.5 | 1.5 | 2.0 | 2.0 | 2.0 | 2.0 | 1.5 | 1.5 |
| Viscurometer at 320°F. |  |  |  |  |  |  |  |  |
| $t_3$, scorch, minutes | 6 | 7 | 5 | 3 | 4 | 3 | 3 | 3 |
| $t_{90}$, cure, minutes | 28 | 55 | 36 | — | — | — | 6 | 6 |
| Cured at 302°F. minutes | 28 | 55 | 36 | 60 | 50 | 35 | 7 | 6 |
| Tensile, psig | 1610 | 1790 | 2000 | 2475 | 2475 | 1375 | 250 | 980 |
| 300% modulus, psig | 660 | 640 | 870 | 1830 | 1160 | — | — | 750 |
| Elongation, percent | 630 | 640 | 600 | 360 | 525 | 280 | 170 | 460 |
| Hardness, durometer A | 54 | 55 | 56 | — | — | — | 62 | 64 |
| B.F.G. Flexometer, 143 psig, 0.175'' stroke, 50°C. ΔT,° | 100 | 97 | 77 | 49 | 55 | 65 | blow-out | blow-out |

1 = EPDM polymer from Example VI
2 = EPDM polymer from Example I
a = EPDM graft polymer from Example IV
b = Repeat EPDM graft polymer from Example IV
c = EPDM graft polymer from Example V, containing dicyclopentadiene
d = EPDM graft polymer from Example V, containing 1,4-hexadiene
e = EPDM graft polymer from Example VI Samples 1 to 6, containing the grafted EPDM polymers, far out-performed Samples 7 and 8, the control mixes. Sample 3 in view of Samples 1 and 2, demonstrates that the addition of a little extra accelerator and sulfur can further improve the cure of the grafted EPDM/diene rubber blends. A similar effect is achieved by grafting higher amounts of accelerator onto the EPDM polymer. Sample 6 had a low graft content, but still out-performed the controls.

We claim:

1. A composition comprising (1) a highly unsaturated diene rubber, (2) an ethylene-higher α-olefin-polyene polymer having grafted thereon about 0.1 part to about 10 parts by weight per 100 parts by weight of the polymer a vulcanization accelerator selected from the group consisting of (a) thiuram sulfides of the formula

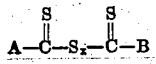

wherein $x$ is 1 to about 6, and A and B are selected from the group consisting of

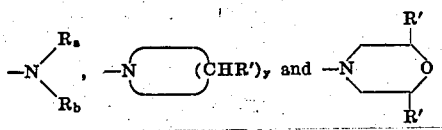

where $R_a$ and $R_b$ are hydrogen, alkyl radicals containing 1 to 24 carbon atoms, an aryl, alkaryl, or aralkyl radical containing 6 to 18 carbon atoms, or a cycloalkyl radical containing 3 to 8 carbon atoms in the ring, and R' is hydrogen or an alkyl radical containing 1 to 4 carbon atoms, and $y$ is 2 to 7, (b) sulfenamides of the formula R''—$S_x$—A, where $x$ and A are defined as above, and R'' is selected from the group consisting of an alkyl radical containing 1 to 18 carbon atoms, an aryl, alkaryl, aralkyl radical containing 6 to 18 carbon atoms, a cycloalkyl radical containing 3 to 8 carbon atoms in the ring, a heterocyclic radical containing 3 to 8 atoms in the ring selected from carbon, oxygen, nitrogen, and sulfur wherein at least two atoms are carbon, and a thiazole ring, (c) thiocarbamylsulfenamides of the formula

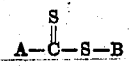

wherein A and B are defined as above, (d) xanthogen disulfides of the formula

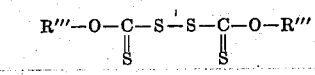

where R''' is an alkyl radical containing 3 to 6 carbon atoms, (e) the sulfide compounds selected from the group consisting of 2,2'-benzothiazyl disulfide, 2-(2,4-dinitrophenylthio)benzothiazole, 2-benzothiazyl-N,N-diethylenethiocarbamylsulfide, 2-benzothiazyl-4-morpholinyl disulfide, 4,4'-dithiodimorpholine, and 4,4'-dithiodipiperidine, and (f) the azole compounds containing a SH group selected from the group consisting of 2-mercaptobenzothiazole, N,N-diisopropyl-2-mercaptobenzothiazole sulfenamide, N,N-diethylthiocarbamyl-2-mercaptobenzothiazole, 2-mercaptobenzothizoline, 2-mercaptobenzoimidazoline, 2-mercaptothiazoline, and 2-mercaptoimidazoline, and (3) sulfur or a sulfur donor; (2) being present in from about 1 percent to about 99 percent by weight of the total weight of (1) and (2).

2. A composition of claim 1 wherein (1) is selected from the group consisting of natural rubber, polyisoprenes, polybutadienes, poly(butadiene-styrene) rubbers, poly(isoprenestyrene) rubbers, polychloroprenes, poly(butadiene-acrylonitrile) rubbers, poly(isoprene-acrylonitrile) rubbers, and polypentenamer rubbers.

3. A composition of claim 2 where in (2) the ethylene-higher α-olefin-polyene polymer consists of about 15 percent to about 90 percent by weight of ethylene, about 10 percent to about 80 percent by weight of a higher α-olefin containing three to about 14 carbon atoms, and from about 0.5 percent to about 20 percent by weight of a nonconjugated diene containing five to about 25 carbon atoms.

4. A composition of claim 3 where in (2) the ethylene-higher α-olefin-nonconjugated diene polymer consists of about 1 percent to about 10 percent by weight of the said nonconjugated diene, the higher α-olefin is selected from propylene and 1-butene, and the ethylene and higher α-olefin are present in from about 20 to 80 weight percent of ethylene and about 19 to 70 weight percent of higher α-olefin.

5. A composition of claim 4 where in (2) the vulcanization accelerator is 4,4'-dithiobismorpholine.

6. A composition of claim 4 where in (2) the vulcanization accelerator is 4,4'-dithiobispiperidine.

7. A composition of claim 4 where in (2) the vulcanization accelerator is 2-mercaptobenzothiazole.

8. A composition of claim 1 containing additionally about 0.1 part to about 1.0 part by weight of an ungrafted vulcanization accelerator selected from the group recited in claim 4 per 100 parts by weight of (1) and (2).

* * * * *